United States Patent [19]

Miles

[11] 3,839,302

[45] Oct. 1, 1974

[54] TREATMENT OF POLY(ARYLENE SULFIDE) REACTION PRODUCT

[75] Inventor: John M. Miles, Bartlesville, Okla.

[73] Assignee: Phillips Petroleum Company, Bartlesville, Okla.

[22] Filed: Oct. 1, 1973

[21] Appl. No.: 402,339

[52] U.S. Cl. .................................. 260/79, 260/79.1
[51] Int. Cl. .............................................. C08g 23/00
[58] Field of Search ............................. 260/79, 79.1

[56] References Cited
UNITED STATES PATENTS 3,707,528   12/1972   Miles .................................. 260/79

Primary Examiner—Melvyn I. Marquis

[57] ABSTRACT

A method is provided for improving the color and other properties of recovered poly(arylene sulfide) by steam treating a reaction slurry of poly(arylene sulfide) solid polymer particles, an organic amide, and by-product alkali metal halide with steam after concentration of the reaction slurry.

6 Claims, 1 Drawing Figure

3,839,302
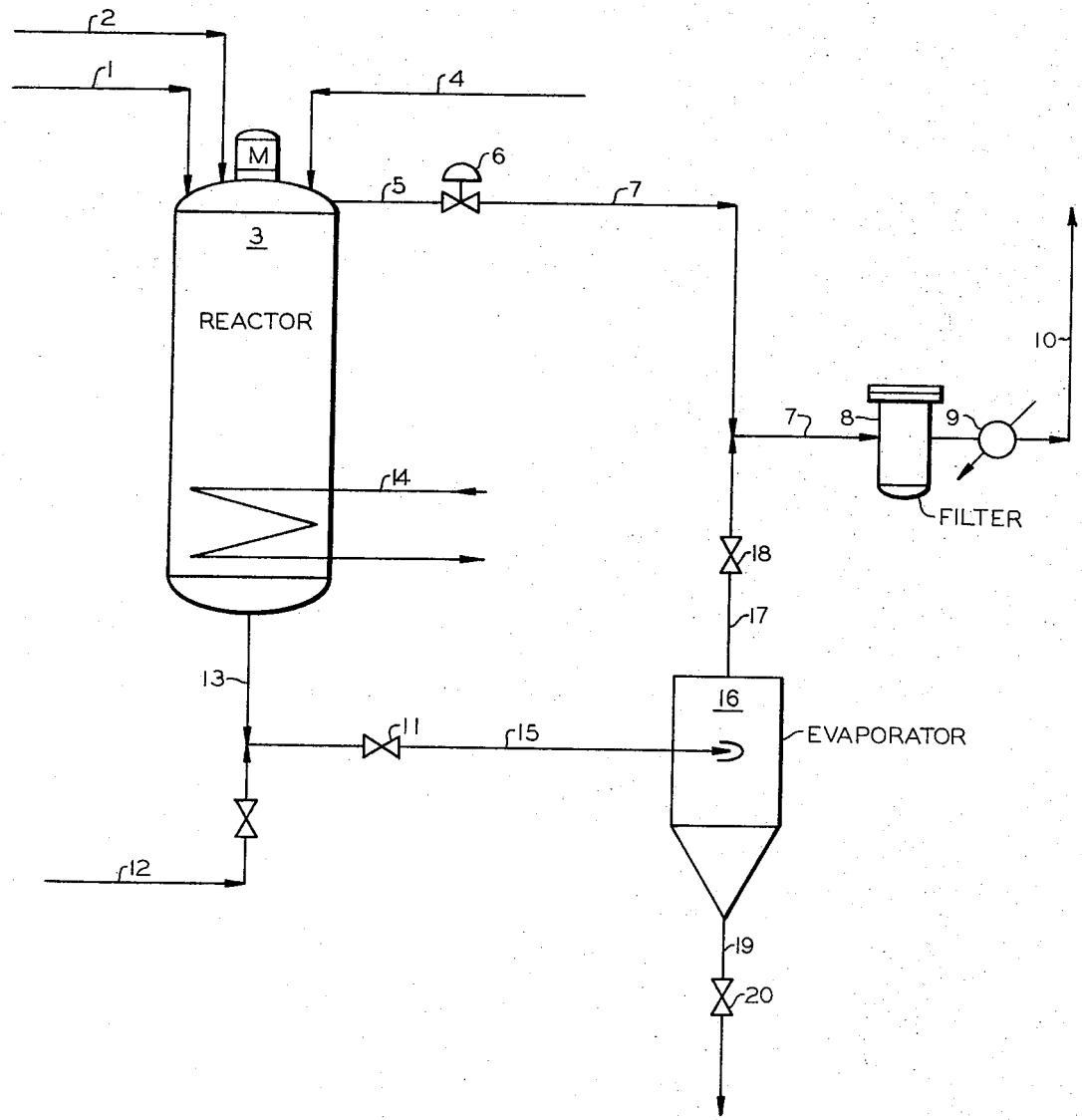

TREATMENT OF POLY(ARYLENE SULFIDE) REACTION PRODUCT

BACKGROUND OF THE INVENTION

This invention relates to the production of arylene sulfide polymers. In one aspect of the invention, it relates to the treatment of reaction slurries in the production of poly(arylene sulfide). In another aspect of the invention, it relates to the improvement of color and other properties of arylene sulfide polymers. In one of its concepts, the invention relates to the improvement of color and other properties of poly(arylene sulfide) by specific treatment of reaction slurries in the production of the polymers.

A poly(arylene sulfide) must be relatively free of metal halide salts and other ash producing contaminants and be of good color to be of full usefulness and value. It was discovered early in the commercial production of poly(arylene sulfide) that the organic amide usually used in polymerization processes caused difficulty in separating the polymer from a slurry by such usual means as filtration as a filter cake of such "pasty" physical characteristics was produced that plugging of the filter was a continuous problem and washing the filter cake free of other comtaminants was impossible. To avoid these problems, a method has been used for removal of the organic amide from the polymer before separation of the polymer and other contaminants is attempted. It was found that the reaction temperature for arylene sulfide polymerization reaction can be run at a sufficiently high range without deleteriously affecting the properties of the polymer produced so that polymer slurry of sufficiently high sensible heat can be produced to allow an atmospheric adiabatic flash evaporation of the organic amide. While this process results in savings and investment in processing equipment and in manufacturing cost per pound of polymer produced, the method, in itself, does not always produce polymer in which the color and other properties are adequate for commercial use. It has now been discovered that steam treatment of a concentrated poly(arylene sulfide) slurry before adiabatic flash evaporation of the organic amide can result in polymer of better color and other properties.

Accordingly, it is an object of this invention to provide a method for improving the color and other properties of poly(arylene sulfide). It is another object of this invention to provide a poly(arylene sulfide) of improved color. It is still another object of this invention to provide a method for treating poly(arylene sulfide) reaction slurry.

Other aspects, objects and the advantages of this invention will be apparent to one skilled in the art upon studying the specification, drawing and the appended claims.

SUMMARY OF THE INVENTION

In accordance with the invention, a poly(arylene sulfide) reaction product comprising a reaction slurry of poly(arylene sulfide), an organic amide, water, and alkali metal halide is produced. This slurry is concentrated by evaporation of the reaction slurry to a reduced pressure. The pressure on the concentrated slurry is then increased up to about 160 psig using live steam. The pressure on the reactor which has dropped as the steam went into solution is increased again as the reactor is heated. The pressure on the concentrated slurry is then reduced in an adiabatic expansion which flashes the amide and water and the poly(arylene sulfide) is passed to recovery of poly(arylene sulfide) reaction product.

In one embodiment of the invention, the reduction of pressure on the heated, concentrated slurry is accomplished in transferring the slurry from a first vessel held at an elevated pressure to a second vessel held at a pressure reduced from that of the first vessel.

The atmospheric adiabatic evaporation can also be carried out in the reaction vessel, but, at present, it is preferred to effect the evaporation by subjecting the slurry to an atmospheric adiabatic expansion in an evaporation zone separate from the reactor.

The process of this invention is useful with poly(arylene sulfides) generally, regardless of the method of preparation. However, the invention is especially useful with polymers prepared with the solution reaction of polyhalo-substituted compounds with metal sulfide as described in U.S. Pat. No. 3,354,129.

According to said patent poly(arylene sulfide) polymers can be prepared at high yield by reacting at least one polyhalo-substituted cyclic compound containing unsaturation between adjacent ring atoms and wherein the halogen atoms are attached to ring carbon atoms with a mixture prepared by contacting an alkali metal sulfide with an organic amide at an elevated temperature. Generally, the organic amide is a liquid at reaction conditions of temperature and pressure. The polymers produced by the process of said patent are ordinarily particulate materials and the properties of these materials will vary considerably depending upon the chosen reactants. Some are high melting thermoplastic materials having excellent high temperature stability, while others can be much lower in molecular weight, including liquids and grease-like materials. Melting point or softening point of these polymers can range all the way from liquids at 25°C to polymers melting above 400°C.

The polyhalo-substituted compounds which can be employed as primary reactants according to said patent are represented by the formulas:

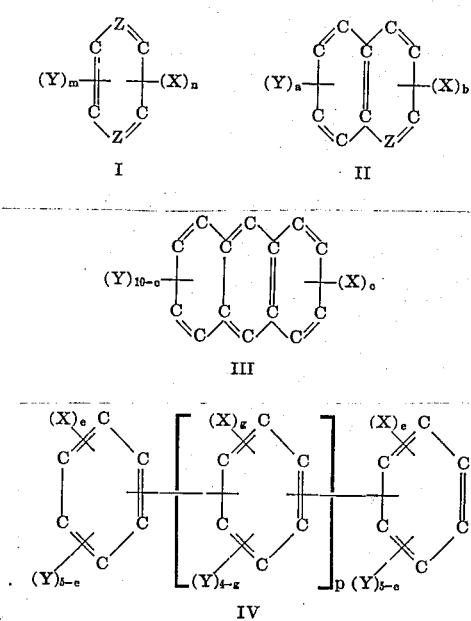

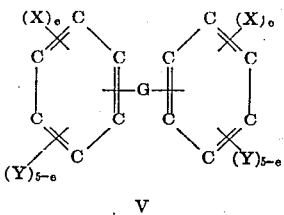

V

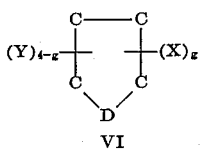

VI wherein each X is a halogen selected from the group consisting of chlorine, bromine, iodine, and fluorine, preferably chlorine and bromine, each Y is selected from the group consisting of hydrogen, —R, —N(R)$_2$,

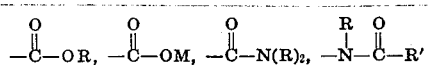

—O—R', —S—R', —SO$_3$H, and —SO$_3$M, wherein each —R is selected from the group consisting of hydrogen and alkyl, cycloalkyl, aryl, aralkyl, and alkaryl radicals containing from one to 12 carbon atoms, inclusive; each Z is selected from the group consisting of —N= and —C=; D is selected from the group consisting of —O—, —S—, and

G is selected from the group consisting of

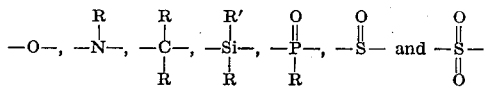

M is an alkali metal selected from the group consisting of sodium, potassium, lithium, rubidium, and cesium; $n$ is a whole integer of from 2 to 6, inclusive; when both Z's in Formula I are —C=, m=6—n, when one Z in Formula I is —C=, m=5—n, when both Z's in Formula I are —N=, m=4—n; $b$ is a whole integer of from 2 to 8, inclusive, when Z in Formula II is —C=, a=8—b, when Z in Formula II is —N=, a=7—b; $c$ is a whole integer of from 2 to 10, inclusive; $e$ is a whole integer of from 1 to 5, inclusive, $g$ is a whole integer of from 2 to 4, inclusive, and $p$ is a whole integer selected from the group consisting of 0 and 1.

The compounds of the above general formulas which are preferred are those which contain not more than three halogen atoms, and more preferably are dihalo-substituted compounds.

The alkali metal sulfides which can be employed in the process of said patent are represented by the formula M$_2$S wherein M is as defined above, and includes monosulfides of sodium, potassium, lithium, rubidium and cesium, including the anhydrous and hydrated forms of these sulfides. The preferred sulfide reactant is Na$_2$S and its hydrates. This sulfide can be purchased having 9 mols of water of hydration per mol of Na$_2$S, or it can be obtained containing about 60–62 weight percent Na$_2$S and about 38–40 weight percent water of hydration.

The organic amides which are employed in the process of my invention are substantially liquids at the reaction temperatures and pressures employed. The amides can be cyclic or acyclic and can have one to about 10 carbon atoms per molecule. Specific examples of such amides are formamide, acetamide, N-methylformamide, hexamethylphosphoramide, tetramethylurea, N,N'-ethylene-di-2-pyrrolidone, N-methyl-2-pyrrolidone (NMP), 2-pyrrolidone, ε-caprolactam, N-ethyl-ε-caprolactam, N,N-dimethylacetamide, and the like.

Some specific examples of polyhalo-substituted compounds of the above general formulas which can be employed in the process of said patent are:
1,2-dichlorobenzene
1,3-dichlorobenzene
1,4-dichlorobenzene
2,5-dichlorotoluene
1,4-dibromobenzene
1,4-diiodobenzene
1,4-difluorobenzene
2,5-dibromoaniline
N,N-dimethyl-2,5-dibromoaniline
1,3,5-trichlorobenzene
1,2,4,5-tetrabromobenzene
hexachlorobenzene
1-n-butyl-2,5-dichlorobenzene,
and the like.

In the polymerization process for producing poly(arylene sulfide) a slurry of reactants is heated to initiate reaction and then the slurry is cooled to remove the heat of reaction thereby maintaining control of the reaction temperature. In a batch reaction, the reactant temperature will peak. After the reaction temperature has peaked, the reaction product slurry is held for a period sufficient to allow the desired amount of chain growth of the polymer. The concentration of the slurry at the time desired chain growth is reached will be in the range of about 0.25 to about 0.35 mols poly(arylene sulfide) repeating unit per mol of organic amide. The temperature of the polymer slurry at the end of the reaction period will ordinarily range from about 475° to about 850°F and more preferably will be within the range of about 475° to about 625°F. The concentration of the reactor polymer slurry will be in the range of about 0.25 to about 0.35 mols poly(arylene sulfide) repeating unit per mol of organic amide. The reactor polymer slurry is then concentrated to about 0.45 to about 0.55 mols poly(arylene sulfide) repeating unit per mol of organic amide, preferably about 0.47 mols poly(arylene sulfide), by reducing the pressure on the reactor sufficiently to remove any water that remains from the original reactor feed solution. This can require the reactor pressure to be reduced to the range of 10 to 20 psig which will cause a temperature reduction in the range of 400° to about 500°F.

As stated above, it has been found that repressuring the reactor with steam to about 140 to about 160 psig provides treatment of the slurry that results in a poly- (arylene sulfide) that has better color and other property than polymers from slurries that are not so treated. The amount of steam necessary to accomplish this treatment is about 0.065 mols of steam per mol of organic amide if 150 psig steam is used in the process. Preferably the pressure of the steam used should be about the same as the desired final pressure on the polymer slurry.

Because the reactor pressure drops as the steam goes into solution the reactor is reheated to a temperature in the range of up to at least the original reactor temperature, but preferably in the range of about 500° to about 625°F, more preferably in the range of about 500° to about 575°F.

The pressure on the reactor slurry is now reduced in an adiabatic expansion, preferably to atmospheric pressure, or even below, using vacuum operation to obtain pressures below atmospheric. During evaporation an inert vapor barrier is provided. In vacuum operation this inert blanket can be supplied by inert vapor purges on seals in the operating equipment. This operation sufficiently removes the organic amide and water to prevent the formation of a sticky product which would be difficult to handle subsequently for the separation of poly(arylene sulfide) from contained solid contaminants. Methods for separating poly(arylene sulfide) from contained contaminants have been set forth in U.S. Pat. No. 3,707,528 and other patents.

The operation of this invention can be best understood by reference to the drawing which will be described along with a specific example of the process of this invention.

In the drawing, the alkali metal sulfide, for this example sodium sulfide, and water were pumped through line 1 and polyhalo-substituted compounds, for this example dichlorobenzene, were pumped through line 2 into the reactor 3 to be reacted at conditions of elevated temperature of about 475°F and a pressure of about 120 to about 150 psig to produce along with the organic amide, for this example N-methyl pyrrolidone, introduced through line 4, a reaction slurry comprising poly(arylene sulfide), sodium chloride, and N-methyl pyrrolidone. The reactants were heated to initiate the reaction, the reaction temperature was allowed to peak, and the reaction product held for a period of two hours to permit polymer chain growth after the temperature peak. At this point, the slurry was at a concentration of about 0.25 to about 0.35 mols phenylene sulfide repeating unit in the polymer per mol of N-methyl pyrrolidone. The slurry was then concentrated by reducing the pressure on the reactor and allowing vapor to leave the reactor through line 5, control valve 6 and line 7, through filter 8 which removes entrained fine solid materials, through heat exchanger 9 to be condensed and was carried through line 10 to a purification system, which is not shown, from which it can be returned to the reactor. At the end of the concentration step, the reactor pressure was 16 psig and the temperature was 450°F.

With valve 11 closed, 150 psig steam was introduced through line 12 and line 13 into the reactor slurry in the reactor 3. Approximately 0.065 moles of steam per mole of N-methyl-pyrrolidone was required to repressure the reactor to 150 psig. The reactor pressure then dropped as the steam went into solution. Heat was introduced into the reactor 3 through indirect heat exchange means 14 to raise the temperature of the slurry to 540°F. During the period of repressuring and reheating, the reactor was, of course, isolated from the rest of the system. On reaching a temperature of 540°F the pressure in the reactor was 150 psig. Valve 11 was then opened and the pressure in the reactor 3 forced the slurry through line 13, valve 11, line 15 into flash evaporator chamber 16 which was at atmospheric pressure. Flash vapors from the adiabatic expansion passed through line 17 open valve 18 and line 7. These vapors were filtered in filter 8, cooled in condenser 9 and could then be returned through line 10 to a purification system, which is not shown. The flashed polyphenylene sulfide reaction slurry could then be removed through line 19 at valve 20 to be further treated to remove solid contaminants such as sodium chloride.

Table I below presents a summary of eight runs using the steam repressuring technique of this invention. Table II below presents a summary of 12 runs repressuring with nitrogen instead of steam.

TABLE I

STEAM REPRESSURING OF POLYPHENYLENE SULFIDE REACTOR RECOVERED POLYMER PROPERTIES

| Run No. | % Volatiles | % Ash | Inherent Viscosity | Coating[1] Test | Melt[2] Flow | 700°F%[3] Wt. Lost | Color[4] |
|---------|-------------|-------|--------------------|-----------------|--------------|--------------------|----------|
| 1S | 0.14 | 0.73 | 0.15 | 1 | 5.8 | 1.08 | 1 |
| 2S | 0.13 | 0.70 | 0.16 | 2 | 18.0 | 1.10 | 1 |
| 3S | 0.11 | 0.71 | 0.20 | 1 | 28.8 | 1.08 | 1 |
| 4S | 0.10 | 0.69 | 0.17 | 2 | 34.0 | 1.04 | 1 |
| 5S | 0.06 | 0.67 | 0.18 | 1 | 57.0 | 1.01 | 1 |
| 6S | 0.10 | 0.69 | 0.18 | 1 | 16.8 | 1.13 | 1 |
| 7S | 0.05 | 0.70 | 0.17 | 2 | 15.3 | 1.03 | 1 |
| 8S | 0.03 | 0.74 | 0.17 | 2 | 8.0 | 1.12 | 1 |

TABLE II

NITROGEN REPRESSURE OF POLYPHENYLENE SULFIDE REACTOR

| Run No. | % Volatiles | % Ash | Inherent Viscosity | Coating[1] Test | Melt[2] Flow | 700°F%[3] Wt. Lost | Color[4] |
|---------|-------------|-------|--------------------|-----------------|--------------|--------------------|----------|
| 1N | 0.04 | 0.83 | 0.17 | 2 | 14.0 | 1.22 | 2 |
| 2N | 0.08 | 0.92 | 0.16 | 1 | 16.3 | 1.48 | 2 |
| 3N | 0.01 | 0.81 | 0.16 | 2 | 45.0 | 1.03 | 2 |
| 4N | 0.05 | 0.78 | 0.11 | 2 | 86.0 | 1.02 | 2 |
| 5N | 0.05 | 0.85 | 0.15 | 2 | 36.0 | 1.02 | 2 |

TABLE II—Continued

NITROGEN REPRESSURE OF POLYPHENYLENE SULFIDE REACTOR

| Run No. | % Volatiles | % Ash | Inherent Viscosity | Coating(1) Test | Melt(2) Flow | 700°F%(3) At. Lost | Color(4) |
|---|---|---|---|---|---|---|---|
| 6N | 0.01 | 0.77 | 0.15 | 2 | 105.0 | 1.16 | 2 |
| 7N | 0.08 | 0.83 | 0.17 | 3 | 93.0 | 1.11 | 2 |
| 8N | 0.08 | 0.91 | 0.21 | 3 | 76.0 | 1.11 | 2 |
| 9N | 0.06 | 0.87 | 0.18 | 3 | 52.0 | 1.02 | 2 |
| 10N | 0.03 | 0.78 | 0.21 | 3 | 175.0 | 1.02 | 2 |
| 11N | 0.13 | 0.90 | 0.17 | 3 | 175.0 | 1.20 | 2 |
| 12N | 0.10 | 0.83 | 0.18 | 3 | 175.0 | 1.26 | 2 |

REACTOR CHARGE AND OPERATING CONDITIONS

Charge:
- $Na_2S$    107.5 to 110.3 lbs.
- NMP    329.5 lbs.
- DCB    126 lbs.
- NaOH    0 to 0.5 lbs.

Operating Conditions:
- Peak Temperature    467–495°F
- Peak Pressure    68–138 psig
- Hold Time After Peak    3 Hrs.
- Hold Temperature    470–476°F
- Reactor Concentration After Venting    0.46 to 0.49 mols poly(arylene sulfide) repeating unit per mol of organic amide (1) Laboratory test used to judge coating appearance and adhesion. Rating of 1 is best rating and coating quality decreases as rating number increases.
(2) There is an indication of the curability of the product. All these values are acceptable.
(3) Indication of low molecular weight fractions in polymer.
(4) Rating of 1 is best rating and color quality decreases as rating number increases.

Comparison of the tables above show that the recovered polymer in the runs where steam repressuring technique was used have a lower percent ash content and average a high rating in the coating test and have a better color than the runs using nitrogen as a representative inert diluent for repressuring.

Reasonable variation and modification are possible within the scope of the foregoing disclosure, the drawing and the appended claims of the invention the essence of which is that there have been provided a method for treating a poly(arylene sulfide) reaction slurry by pressuring the reaction slurry with steam after concentrating the slurry by which method poly(arylene sulfide) of improved color, lower ash content and improved coating characteristics is obtained.

I claim:
1. A method for treating a poly(arylene sulfide) reaction product said method comprising:
   a. producing a reaction slurry comprising poly(arylene sulfide), an organic amide, and alkali metal halide;
   b. producing a concentrated slurry at a concentration in the range of about 0.45 to about 0.55 mol polymer repeating unit per mol organic amide by evaporation of said reaction slurry at reduced pressure;
   c. increasing the pressure on said concentrated slurry to about 140 to about 160 psig using steam;
   d. heating said concentrated slurry to a temperature in the range of up to at least the original reaction slurry temperature;
   e. reducing the pressure on said concentrated slurry in adiabatic expansion; and
   f. recovering the poly(arylene sulfide) reaction product.

2. The method of claim 1 wherein said organic amide is N-methyl pyrrolidone and said alkali metal halide is sodium chloride.

3. The method of claim 1 wherein said steam pressured concentrated slurry is heated to a temperature in the range of 500° to about 625°F.

4. A method wherein the pressure on the heated concentrated slurry of claim 3 is reduced to about atmospheric and the poly(arylene sulfide) reaction product is recovered.

5. A method of claim 4 wherein said heated concentrated slurry is transferred from one vessel at said pressure of about 140 to about 160 psig to another vessel at a reduced pressure to accomplish the adiabatic expansion.

6. A method of claim 5 wherein the concentration of said concentrated slurry is about 0.47 mols poly(arylene sulfide) repeating unit per mol organic amide, the pressure on the concentrated slurry is increased to about 150 psig using steam, the temperature of the slurry is then increased to about 540°F and the pressure is then reduced to atmospheric.

* * * * *